Sept. 19, 1961     E. F. WEBB     3,000,034
WINDSHIELD CLEARING SYSTEM

Filed May 19, 1958     3 Sheets-Sheet 1

INVENTOR.
EDMOND F. WEBB
BY Lowell & Henderson
ATTORNEY

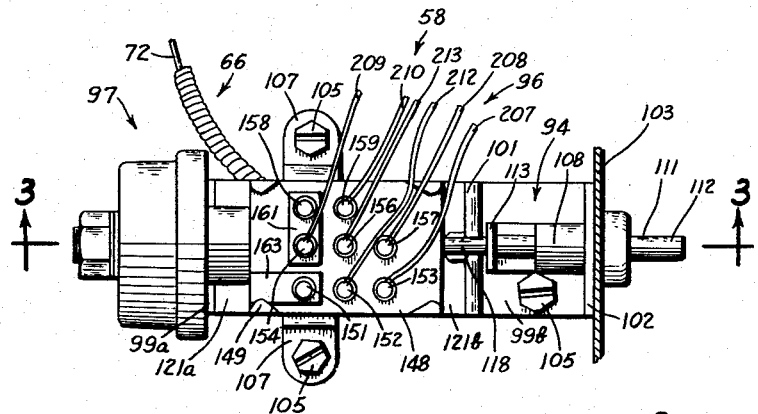
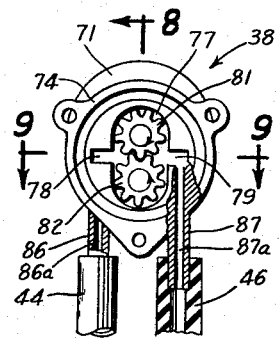
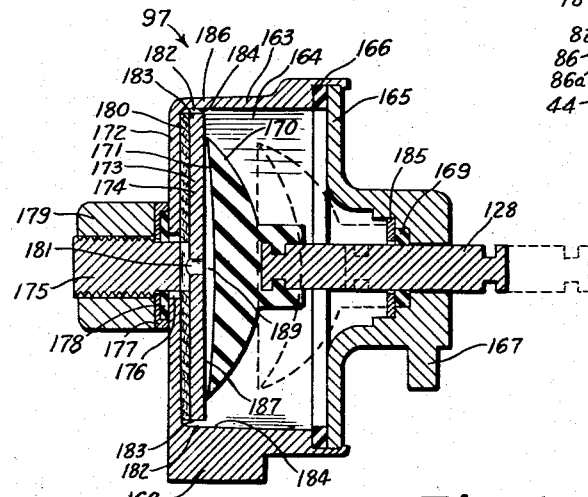
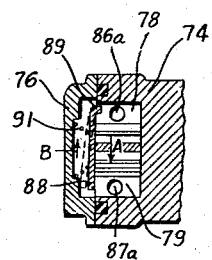
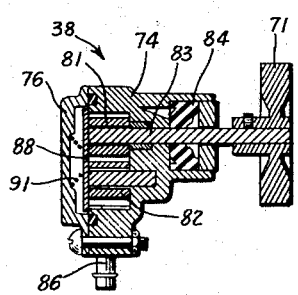
INVENTOR.
EDMOND F. WEBB

Sept. 19, 1961    E. F. WEBB    3,000,034
WINDSHIELD CLEARING SYSTEM
Filed May 19, 1958    3 Sheets-Sheet 3
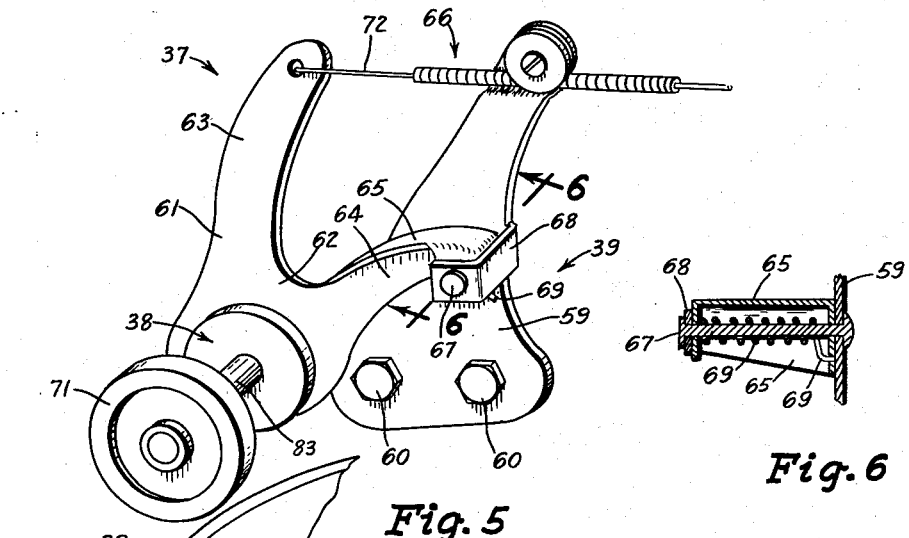
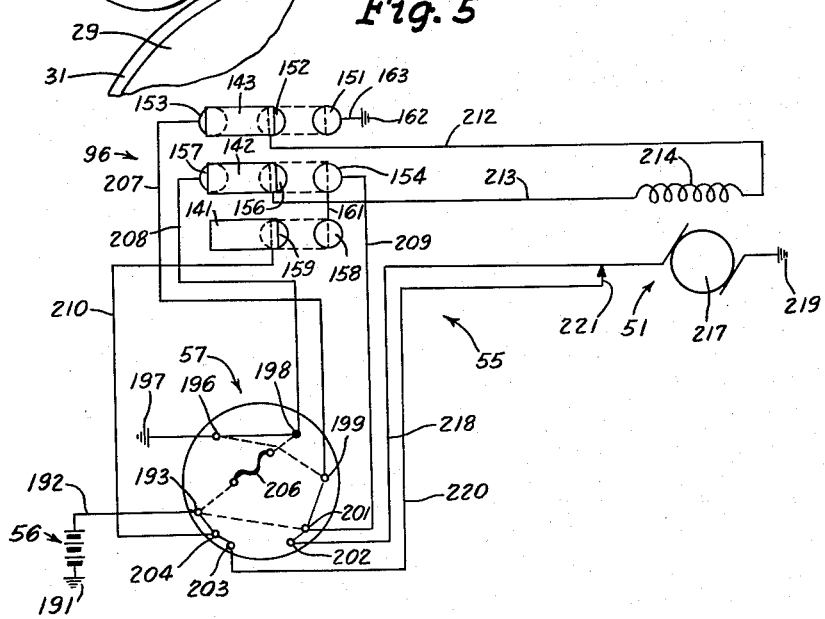
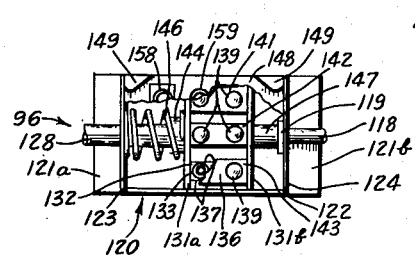
INVENTOR.
EDMOND F. WEBB
BY Lowell & Henderson
ATTORNEY United States Patent Office 3,000,034
Patented Sept. 19, 1961

3,000,034
WINDSHIELD CLEARING SYSTEM
Edmond F. Webb, Franklin, Mich., assignor to The Delman Company, Cookeville, Tenn., a corporation of Tennessee
Filed May 19, 1958, Ser. No. 736,132
11 Claims. (Cl. 15—250.02)

This invention relates to a windshield clearing system for vehicles which employs an electrically operated wiper unit and a mechanically operated washer unit, and more particularly to the provision of a manually actuated device for controlling the operation of the wiper and washer units in combination with or independently of a separate conventional switch arrangement for independent control of the wiper unit.

It is an object of this invention to provide in a windshield clearing system including a mechanically operated washer unit and an electrically operated wiper unit utilizing a reversible electric motor, a time delay device for controlling the operation of both of the units.

It is another object of this invention to provide in a windshield clearing system including an electric wiper unit and a mechanical washer unit wherein a hand operated switch is operable to control the wiper unit, a manually actuated device operable to simultaneously actuate the two units and to de-actuate the wiper unit subsequent to the washer unit, with the control of the units being either independent of or in combination with the switch.

Another object of this invention is to provide in a windshield clearing system including an electric wiper unit utilizing a reversible motor, and a mechanical washer unit, and wherein a hand operated switch is operable through a control circuit to operate the wiper unit, unitary means which is manually operated and capable of acting with or without the switch to concurrently operate the units and to stop the operation of the units at separated intervals of time.

A further object of this invention is to provide in a windshield clearing system including an electric wiper unit and a mechanical washer unit wherein a hand operated switch is operable through a control circuit to operate the wiper unit alone, manually operated means including reversing switch means interposed in the circuit for controlling the operation of the wiper unit in combination with or independently of the hand operated switch, including further means operable with the switch means for controlling the operation of the washer unit, and also means operatively connected to the switch means for delaying the de-actuation of the wiper unit relative to the de-actuation of the washer unit.

Yet another object of this invention is to provide in a windshield clearing system including an electric wiper unit, a mechanical washer unit, and a control circuit including a conventional switch for independent operation of the wiper unit, a unitary assembly mountable in the driver's compartment for control of the two units independently of or in combination with the switch, the assembly operable upon actuation to operate said units concurrently and upon release to stop the operation of the washer unit prior to the stopping of operation of the wiper unit.

Another object of this invention is to provide means including a reversing switch, an actuating device, and a time delay device for control of a windshield clearing system embodying an electrical wiper unit and a mechanical washer unit, which means is embodied in a unitary structure of a simple and economical construction and which is capable of operating both units in combination by means of a manually actuated movement.

These objects and other advantages will become readily apparent by reference to the following description and the accompanying drawings, wherein:

FIG. 2 is an enlarged fragmentary top plan view of the switch actuating assembly of the system, with some parts shown in section and others broken away for the purpose of clarity;

FIG. 4 is an enlarged sectional view of the time delay device of the switch actuating assembly of FIG. 2;

FIG. 5 is an enlarged fragmentary perspective view of the pump assembly of the system;

FIG. 6 is a sectional view taken along the line 6—6 of FIG. 5;

FIG. 7 is an enlarged fragmentary vertical elevational view of the pump unit of FIG. 5, with a cover plate removed and with some of the parts broken away and shown in section for purpose of clarity;

Figure 1:
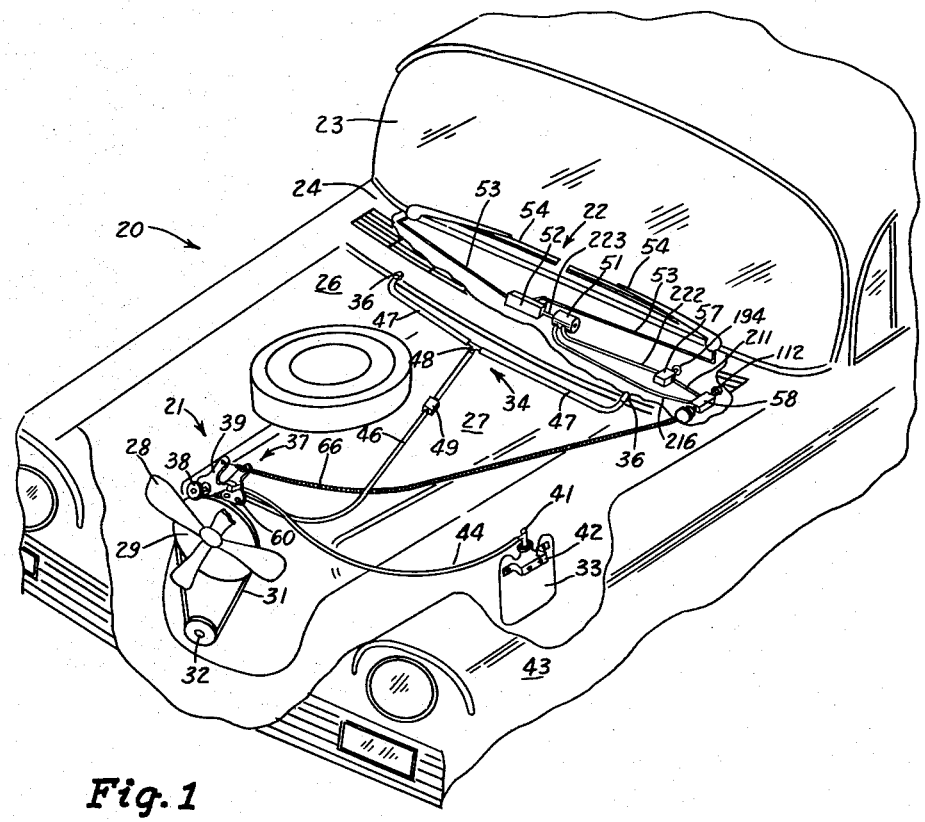
FIG. 1 is a fragmentary perspective view of an automobile, showing one embodiment of a windshield clearing system to which this invention is directed, with parts broken away for the purpose of clarity.

FIGS. 8 and 9 are sectional views taken respectively along the lines 8—8 and 9—9 of FIG. 7, and showing the cover plate as though it were present in FIG. 7;

FIG. 10 is an enlarged top plan view of the reversing switch of FIG. 2, with parts broken away for the purpose of clarity; and FIG. 11 is a schematic wiring diagram of the control circuit for the windshield clearing system of FIG. 1.

With reference to the drawings, there is illustrated in FIG. 1 a windshield clearing system as applied to a vehicle 20 which includes a windshield washer unit and a windshield wiper unit designated generally as 21 and 22, respectively. The vehicle is illustrated as having a windshield 23 and an engine cowl 24 extended forwardly of the windshield, and has the usual engine compartment 26 in which is located the engine 27, a fan 28, a pulley 29, and a fan belt 31 trained about the pulley 29 and driven off a crank shaft pulley 32.

The windshield washer unit includes a fluid reservoir 33 from which fluid is supplied to a discharge unit 34 which includes a pair of nozzle devices 36 for directing the fluid against the windshield 23. Fluid pressure is applied by a pump assembly 37 which includes a pump unit 38 interconnected between the reservoir 33 and the discharge unit 34. The pump unit 38 is pivotally mounted on a mounting unit 39 which is carried on the front of the engine 27 adjacent the pulley 29.

The fluid reservoir 33 is shown as being a flexible bag having a filler opening at the top in which a plug 41 is insertable. The reservoir 33 is hung from a bracket 42 which is secured on the inside (not shown) of a fender 43 of a vehicle 20, so as to be within the engine compartment 26. A fluid transmitting conduit 44 is connected between the reservoir 33 and the pump unit 38 to enable the pump unit, upon operation, to withdraw fluid from the reservoir 33 and then force the fluid under pressure through a conduit 46 to the discharge unit 34.

The nozzle devices 36 of the fluid discharge unit 34 are shown as being mounted to the vehicle directly in front of the cowl 24 in a spaced manner so that each device 36 services one side of the windshield 23. The nozzle devices 36 are of a known type embodying the jet principle, so as to emit and direct a high pressure stream of fluid against the windshield 23. A fluid conduit 47 connects each nozzle device 36 to a T fitting 48, the conduit 46 being attached to the stem of the fitting 48. A one way check valve 49 is interposed in the conduit 46 for the purpose of permitting fluid to flow through the conduit to the discharge unit 34, but preventing a backward or reverse flow therethrough toward the pump unit 38.

Referring now particularly to FIGS. 1 and 11, the wiper unit 22 includes a reversible type electric motor 51 adapted to operate a gear mechanism 52 which in turn operates a conventional transmission mechanism 53 for oscillating a pair of wiper blades 54 across the windshield 23. Additionally, the wiper unit 22 includes as a part of the control circuit 55 (FIG. 11) therefor, a source of power, such as the vehicle battery 56 and a hand operated switch 57 mounted on the vehicle dashboard (not shown).

For the purpose of controlling and cordinating the operation of the washer and wiper units 21 and 22, respectively, a switch actuating assembly 58 (FIGS. 2 and 3) is provided in the vehicle's driver compartment for manual operation. As will be described in detail hereinafter, the switch actuating assembly 58 is arranged to operate the washer and wiper units concurrently, and also to stop the operation of the wiper unit 22 at an interval of time subsequent to the stopping or de-actuation of the washer unit 21. Additionally, the switch actuating assembly 58 is adapted to operate the washer and wiper units either in combination with or independently of the hand operated switch 57.

Referring particularly to FIGS. 5 and 6 wherein the pump assembly 37 is illustrated, the mounting unit 39 for pivotally mounting the pump unit 38 adjacent the fan belt 31, includes a stationary bracket 59 which is secured to the front of the engine 27 by cap screws 60 (FIG. 1). A pivoting bracket 61 includes a base portion 62, adapted to carry the pump unit 38, and a pair of arms 63 and 64 arranged in a V formation. The upper arm 63 is secured to the free end of a Bowden wire unit 66, carried on the stationary bracket 59. Flaring outwardly from the lower arm 64 is a portion 65 which is pivotally connected, as by a pin 67, with the stationary bracket 59 and an extension member 68 integral therewith.

By utilizing a torsion spring 69 in a conventional manner with the pivotal connection between the brackets 59 and 61, the pivoting bracket 61 is biased toward a normal inoperative position wherein a driving wheel 71 for the pump unit 38 is spaced from and thus disengaged from the fan belt 31. It may be noted that by extending the wire 72 of the Bowden unit 66, or moving it further to the left as viewed in FIG. 5, the pivoting bracket 61 is rotated counterclockwise relative to the stationary bracket 59, and the driving wheel 71 is moved into engagement with the fan belt 31 whereby to operate the pump unit 38.

Referring now to FIGS. 7-9, inclusive, a pump unit 38 is illustrated as being of a gear type which is described in detail in my pending application entitled "Gear Pump," Serial No. 713,486 filed February 5, 1958. The pump unit 38 includes a housing 74 having a cover 76 at one end. A main chamber 77, formed within the housing, is provided with a pair of laterally spaced side chambers 78 and 79. Within the main chamber 77, is a pair of meshed gears 81 and 82, with the gear 81 being connected to a shaft 83 that extends through a fluid tight bearing arrangement 84 in the closed end of the housing 74 and which is connected to the circular driving wheel 71.

A pair of tubular legs 86 and 87 are provided integral with the housing 74 so that the bore 86a of the leg 86 communicates with the side chamber 78 and the bore 87a of the leg 87 communicates with the side chamber 79. Thus, by attaching the respective conduits 44 and 46 to the legs 86 and 87, upon a contact of the driving wheel 71 with the fan belt 31, the gears 81 and 82 are caused to rotate in a direction indicated by the arrows in FIG. 7 to withdraw fluid from the reservoir 33 through the conduit 44 to the pump unit 38. The fluid flows from the chamber 78 to the chamber 79 in a path indicated by the arrow "A" in FIG. 9, and in turn is forced through the conduit 46 to the discharge unit 44 for emission against the windshield 23.

For the purpose of providing a pressure relief across the pump unit 38, the cover 76 houses a circular plate 88 of an extent to cover both the main chamber 77 and the side chambers 78 and 79, the plate 88 having a lip projection 89 (FIG. 9) which is extended into the side chamber 78 on the low pressure side of the system. A spring 91 is arranged between the plate 88 and the inside of the cover whereby to bias the plate 88 to a normally inoperative position against the faces of the gears 81 and 82 (FIG. 8). It may be seen, however, that upon the increase of the fluid pressure in the side chamber 79 which is on the high pressure side of the system, the biasing force of the spring 91 is overcome and the plate 88 is tipped, as indicated by the dotted lines in FIG. 9. Thus, a bypass or reverse flow of the fluid from the side chamber 79 to the side chamber 78, as indicated by the arrow "B" in FIG. 9, is provided to relieve the pressure system. Once the system is relieved, the spring 91 again biases the plate 88 back to its normally inoperative position.

In summary, the pump unit 38 is provided for interconnecting the reservoir 33 to the fluid discharge unit 34 for transmitting fluid under pressure therebetween, and which pump unit includes a bypass arrangement providing for intermittent relief and equalization of the fluid pressure across the pump unit 38.

The switch actuating assembly 58 (FIGS. 2, 3 and 4), for controlling the combined action of the washer and wiper units is a combination of: (a) an actuating device 94 for manual actuation of the pump assembly 37 whereby to control the position of the pivoting bracket 61 (FIG. 5) and thus the pump driving wheel 71 relative the fan belt 31 for on-off operation of the pump unit 38; (b) an electric two-position reversing switch 96 interposed in the control circuit 55 (FIG. 11) and operatively associated with the actuating device 94 for on-off control of the wiper motor 51 synchronized with on-off control of the pump unit 38; and (c) a time delay 97 operatively associated with the reversing switch 96 for concurrent initiation of a delayed return movement of the switch 96 from its "on" position to its "off" position relative to movement of the pump unit 38 from "on" to "off" operation as controlled by the actuating device 94.

The switch actuating assembly 58 (FIG. 3) comprises a mounting bracket 98 which includes a pair of substantially horizontal base members 99a and 99b integral with but separated by a horizontally disposed upper member 101, and an upright member 102 at one end of a member 99 adapted to be mounted adjacent the dashboard 103 for the vehicle 20. The mounting bracket 99 is secured to a plate 104, which in turn is mounted to the vehicle, as by a bolt 105 inserted through the plate to the inner base member 99b and by a cap screw 106 secured through the plate to the outer base member 99a. The upper member 101 is also supported on the plate 104 by means of an inverted U-shaped support member 107 secured thereto which is connected to the plate by a pair of bolts 105.

A bushing 108 is secured in a horizontally disposed manner to the upright member 102 whereby the bore of the bushing is aligned with an opening 109 formed in the member 102 and an opening 110 formed in the dashboard 103. A push rod 111 is inserted through the openings 109 and 110 and the bore of the bushing 108 and is reciprocally movable therethrough. The outer end 112 of the rod 111 is adapted for finger contact and the inner end is secured to the upstanding portion of a carrier member 113 which is a part of the actuating device 94.

The carrier member 113 includes a lower depending portion 114 (FIG. 3) to which is attached the wire 72 of the Bodwen wire unit 66. The wire extends through an opening 115 provided therefor in the mounting bracket 98 and extends through a horizontally disposed tubular sleeve 116 secured to the upper member 101 of the bracket, as by a clip device 117. The wire unit 66 is then connected as aforementioned to the pump assembly 37 (FIG. 5). It may thus be seen that by pushing against the outer end 112, the push rod 111 moves inwardly or to the left as viewed in FIG. 3, and the carrier member 113 and the wire 72 also move to the left. An extension 118 for the push rod 111 is extended horizontally outwardly from the carrier member 113 and has an outer flared end 119 adapted for actuation of the reversing switch 96.

The reversing switch 96 (FIG. 3) includes an open-top box housing 120 having a base 121 with extended flanges 121a and 121b, sides 122, and ends 123 and 124. The end flange 121b is secured to the member 101 by one of the bolts 105 and the end 121a has a hole 125 formed therein for a purpose to appear hereinafter. The housing end 124 adjacent the actuating device 94 is provided with an opening through which the extension 118 is reciprocally moveable, the flared end 119 of the extension thus limiting the movement of the extension 118, and in turn the push rod 111, to the right as viewed in FIG. 3. The end 123 is also provided with an opening through which a connector rod 128 is inserted for longitudinal movement, the rod 128 being connected within the housing to a contact carrier block 129 of plastic or the like. The carrier block 129 has upstanding end panels 131a and 131b (FIG. 10) and a trio of transversely spaced, parallel, longitudinally extended support members 132 (FIG. 10) extended between and integral with the end panels 131a and 131b. Each support member 132 has a pair of longitudinally spaced wells 133 formed therein, and a coil spring 134 is inserted in each well 133 and extends above the height of the support members.

A metallic contact cap 136 of an inverted U-shape and having a length equal to the spacing between the end panels 131 is loosely inserted over each support member 132, whereby the sides (not shown) of a cap depend adjacent the respective sides 137 (FIG. 10) of a support member 132 to prevent lateral movement of the cap 136. The top of each cap 136 is provided with a pair of cavities 138 (FIG. 3) which are longitudinally spaced so that each cavity is vertically aligned with a spring 134 that extends upwardly from a respective well 133 below the cavity 138. By virtue of each cavity 138, a contact 139 is formed on top of the contact cap 136, it being obvious that three transversely spaced, parallel rows 141, 142, and 143 (FIG. 10) of pairs of longitudinally spaced and aligned contacts 139 are formed, whereby each row is a conductor of current, as between the respective contacts therein.

A projection 144 (FIG. 3) extends outwardly from the end panel 131a and is connected to the inner end of the connector rod 128. A spring 146 is arranged about the projection 144 and between the housing end 123 and the end panel 131a whereby to bias the contact carrier block 129 toward the end 124 of the housing.

Another projection 147 extends horizontally outwardly of the end panel 131b and is adapted to abut the flared end 119 of the push rod extension 118. Thus, due to the bias of the spring 146, the contact carrier block 129 is normally in the position best indicated in FIG. 3, wherein the projection 147 forces the flared end 119 against the end 124 of the switch housing. Additionally, it is seen that due to the bias of the spring 146, the normal position of push rod 111 is one wherein the outer end 112 of the push rod is protruded to the utmost extent beyond the dashboard 103.

This normally biased position of the contact carrier block 129, which shall hereinafter be termed the "park" or "off" position of the reversing switch 96, thus occurs when the actuating device 94 and the pump assembly 37 are in what shall hereinafter be termed the "inoperative" or "off" position of the pump assembly 37, due to the non-actuated position of the push rod 111.

A terminal cap 148 (FIGS. 3 and 10) is secured on top of the switch housing, as by bending the corner flanges 149 of the housing sides 122 over the cap. As shown in FIG. 2 the cap 148 is provided with eight terminals arranged in three transversely spaced, longitudinally extending parallel rows of three, three and two. The terminals in each row are spaced longitudinally apart a distance substantially equal to the longitudinal spacing between the contacts 139 in a respective contact row therebelow, and are superimposed over the three rows of contacts 141, 142, and 143, in a manner best shown in FIG. 11.

Thus, it is noted that terminals 151, 152 and 153 are superimposed over the contacts in row 143, that terminals 154, 156 and 157 are over row 142, and terminals 158 and 159 are over row 141 of contacts 139. By virtue of the same spacing of contacts and terminals, when the rows of contacts 141—143 are in the "park" position of the reversing switch 96, indicated best by the solid line blocks in FIG. 11, terminals 152—153 and 156—157 are electrically interconnected due to their respective contacting or touching relation with the contacts 139 of the rows 143 and 142.

Figure 3:
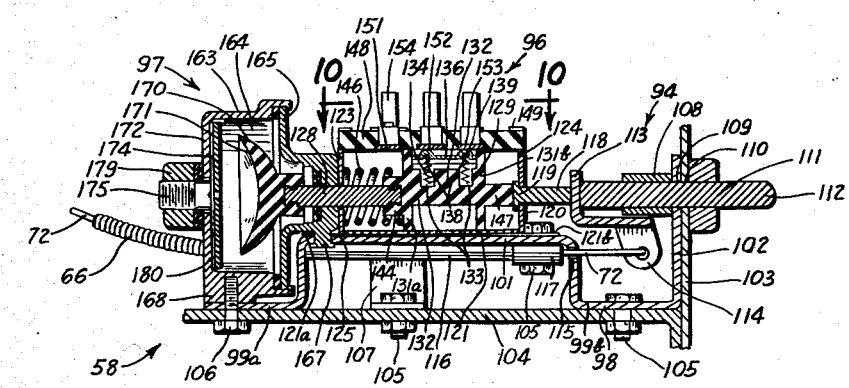
FIG. 3 is a sectional view taken along the line 3—3 of FIG. 2.

To place the reversing switch 96 in an "on" position, the push rod 111 is moved forwardly or to the left as best indicated in FIG. 3, whereby the flared end 119 thereof moves the contact carrier block 129 also to the left and against the compression of the spring 146. This movement of the block 129 results in a movement of the contact rows 141, 142, and 143 to a position best indicated by the dotted line blocks in FIG. 11. Thus, in the "on" position of the reversing switch 96, terminals 151—152, 154—156, and 158—159 are interconnected for the passage of electric current therebetween, again due to their respective touching relation with the contacts 139 in the three contact rows therebelow. For a purpose to appear hereinafter, the terminals 154 and 158 are permanently interconnected, as by a metallic plate 161 (FIG. 2), and the terminal 151 is grounded at 162, as by a plate 163 (FIG. 2) which contacts an adjacent corner flange 149 of the switch housing, that is grounded through the base 121 of the switch housing to the vehicle 20.

The time delay 97 comprises a circular housing 163 having one end open. A fluid chamber 164 is formed by the securement of a cover plate 165 to the housing 163 at the open end thereof, a gasket 166 being inserted between the housing 163 and the plate 165 to provide a fluid tight junction. The cover plate 165 is provided with a depending element 167 which extends through the opening 125 formed in the base 121 of the reversing switch housing and also through an opening provided therefor in the upper member 101 of the mounting bracket 98. By peening the end of the element 167, the cover plate 165 is securely mounted to the upper member 101. Additionally, the circular housing 163 has a leg portion 168 provided with a threaded bore into which the cap screw 106 is insertable. Thus the time delay is securely fixed to the mounting bracket 98.

The connector rod 128 protruding from the reversing switch housing 120 extends through an opening provided therefor in the cover plate 165, the arrangement being fluid tight by the provision of an O ring seal 169 and a retainer 185 (FIG. 4). The end of the connector rod 128 within the fluid chamber 164 is connected to a vacuum cup 170, of a flexible material such as rubber, the concave face 171 of which faces the closed end 172 of the housing 163. A bleed plate device 173 is mounted to the end 172 and comprises a circular bleed plate 174 integral with a threaded stem 175 which is inserted through an opening 176 provided therefor in the closed end 172. By mounting a seal retainer 177 and a washer 178 to the threaded stem 175 outside the end 172, upon the threaded insertion of a nut 179 onto the stem 175, a fluid tight arrangement is provided whereby the circular bleed plate 174 may be adjustably moved relative to the closed end 172 from which it is spaced.

A plurality of circular filters 180 of a porous material such as felt, are inserted between the circular bleed plate 174 and the closed end 172 and are held therebetween in an adjustable manner as regards compression by the adjusting nut 179. A T-shaped passage 181 is formed in the bleed plate device 173 (FIG. 4), and a space 182 is provided between the peripheral edge 183 of the filters 180 and the inner surface 184 of the circular housing wall 186. The chamber 164 is normally filled with a fluid such as oil.

The arrangement of the time delay 97 is such that the normal position of the vacuum cup 170 is one of being spaced from the bleed plate 174 within the chamber 164 as shown by the dotted lines in FIG. 4. This is due to the bias of the spring 146 in the reversing switch 96 forcing the contact carrier block 129 and thus the connector rod 128 to the right as viewed in FIG. 3. However, upon a movement of the push rod 111 to the left, the resultant movement of the push rod extension 118, the carrier block 129, and the connector rod 128 forces the vacuum cup 170 against the inner side 187 of the bleed plate 174 (FIG. 4). By this movement, the concave face 171 of the cup 170 is spread out to become substantially contiguous with the inner side 187 as shown by the solid lines in FIG. 4.

Upon a release of the push rod 111 from its actuated position, the normal tendency of the rod 111, the carrier block 129, and the connector rod 128 is to return immediately to their nonoperative positions, or to move to the right as viewed in FIG. 3. Such immediate return movement of the block 129 and the rod 128, however, is prevented by the setting up of a vacuum between the concave face 171 of the vacuum cup 170 and the inner side 187 of the circular bleed plate 174. The vacuum formed between these two surfaces is slowly relieved, however, by virtue of a bleeding of the fluid within the chamber 164 being permitted around the periphery 183 of the bleed plate 174, through the mass of filters 180 to the center thereof, and then through the passage 181 to the space 189 formed between the concave face 171 and the inner side 187 of the bleed plate 174. By such a bleeding process, the vacuum is gradually released until such time as it is completely released whereupon the bias of the spring 146 then affects a fast return of the connector rod 128 and the carrier block 129 to their original positions. Thus, it is seen that upon the movement of the vacuum cup 170 to the left as viewed in FIGS. 3 and 4, a time delay is initiated to occur upon a release of the actuating push rod 111.

Referring now to FIG. 11, the components of the control circuit 55 include a source of power, such as the vehicle battery 56, the hand operated switch 57 mounted on the vehicle dashboard 103, the reversing switch unit 96 the operation of which is controlled by the push rod 111 and the time delay 97, the electric motor 51, and electric current transmitting lines interconnecting these elements.

The battery 56 in grounded on one side at 191 and connected at the other side by a line 192 to a terminal 193 in the switch 57. The hand operated switch 57 is a two position switch, as determined by a control knob 194 (FIG. 1), and includes the terminal 193, terminal 196 connected to a ground 197, separated terminals 198 and 199, and permanently interconnected pairs of terminals 201, 202 and 203, 204 respectively, and a resistance element 206.

The hand operated switch 57 is shown in one position, which shall hereinafter be termed the "on" position, by the use of solid lines interconnecting the terminals 196—198, 199—201, and 193—204, these respective terminals thus being interconnected in pairs for the transmission of current therebetween. The "off" or "park" position of the switch 67 is shown by dotted lines interconnecting the pairs of terminals 196—199, 193—198 across the resistance 206, and 193—201.

Terminals 153, 157, 154 and 159 of the switch 96 are connected to the terminals 199, 198, 201 and 204, of the switch 57 by leads 207, 208, 209 and 210, respectively, these leads adapted to being bound in one group 211 (FIG. 1). Terminals 152 and 156 are each connected by leads 212 and 213 respectively to a respective side of the field 214 of the wiper motor 51, and the leads 212 and 213 are adapted to being bound in a group 216 (FIG. 1).

The terminal 202 of the hand switch 57 is connected to one side of the motor armature 217 by a lead 218, the other side of the armature being grounded to the vehicle at 219; and the terminal 203 is connected by a lead 220 to the lead 218 in front of the armature 217 through an automatic parking switch 221. The leads 218 and 220 are adapted to being bound in a group 222 (FIG. 1).

In the operation of the clearing system, the switch actuating assembly 58 (FIG. 3) is shown in the normal "off" position wherein the pump unit 38 is inoperative and the reversing switch 96 (FIG. 11) is in the "park" position. With the hand operated switch 57 (FIG. 11) also being in the "park" position, as indicated by the full line connection between the terminals therein, the control circuit 55 is open. Thus the washer and wiper units are both inoperative. By changing the position of the switch 57 to the one indicated by the dotted line connections between the terminals (FIG. 11), the switch 57 is placed in the "on" position whereby the motor 51 is operated to oscillate the wipers 54 across the windshield 23 in a normal manner.

Upon changing the position of the switch 57 to "on," it is to be noted that current from the battery 56 is directed by the switch 57 through the lead 218 to the motor armature 217 to ground 219. Additionally, as the reversing switch is in the "park" position and thus in series with the switch 57, the current from the battery 56 is directed through the lead 213 to the left side of the armature field 214, as viewed in FIG. 11. The curent then passes through the field back through the lead 212, across the reversing switch 96, through the lead 207 to the terminal 199 of the switch 57 and to ground 197.

As the direction of current through the motor field 214 relative to the direction of current through the armature 217 determines the rotational direction of the motor output shaft 223 (FIG. 1), a changing of the switch 57 back to "park" causes the current to flow through the armature field 214 from right to left, as viewed in FIG. 11. Thus the rotational output of the motor 51 is reversed, whereupon the transmission mechanism 52 is operable to rotate the wipers 54 toward and into the parked position indicated in FIG. 1, wherein they are drawn down tightly against the bottom of the windshield 23 and out of view.

Such reverse rotation is abruptly halted by the action of the parking switch 221 which is mechanically actuated by such reversed rotation to open the circuit 55. A detailed description of the parking switch 221 is not deemed necessary as it is a conventional type switch well known in the field, being found, for example, on vehicles of Chrysler manufacture. It is thus seen that the hand operated switch 57 is operable to operate the wiper motor 51 in an "on-off" manner.

Turning now to the switch actuating assembly 58, a manual movement of the push rod 111 to the left as viewed in FIG. 3 simultaneously causes three actions. First, the carrier member 113 pushes the wire 72 of the unit 66 also to the left as viewed, resulting in the pivoting bracket 61 (FIG. 1 and 5) moving the wheel 71 of the pump unit 38 into a contacting engagement with the fan belt 31. Assuming engine operation, the result is immediate operation of the washer unit 21.

Secondly, movement of the push rod extension 118 (FIG. 3) forces the reversing switch contact carrier block 129 to the left as viewed. This movement changes the position of the reversing switch 96 from one of "park" to one of "on" as indicated by the dotted line rows (FIG. 11). This changed position of the reversing switch 96, places it in parallel with the hand switch 57 and thus connects the battery 56 with the left side of the motor field 214 as viewed in FIG. 11, the current passing through the field 214, then through the lead 212 and across the switch 96 to ground 162. Thus, as the current passes from left to right through the field 214 as was the case when the switch 57 was turned "on," the rotational direction of the output shaft 223 again causes the wipers 54 to oscillate in a normal manner.

Thirdly, movement of the push rod 111, in addition to concurrently actuating the washer and wiper units 21 and 22, respectively, via the actuating device 94 and the reversing switch 96, forces the connector rod 128 to the left as viewed in FIG. 3, whereby the vacuum cup 170 of the time delay 97 is in turn forced against the bleed plate 174. Concurrently, therefore, with actuation of the washer and wiper units, the time delay is moved into a position setting up its time delaying action, or putting it another way, the time delay is poised for action.

Upon a release of the push rod 111, the compression of the torsion spring 69 (FIGS. 5 and 6) is sufficient to force the pivoting bracket 61 in a clockwise direction relative the stationary bracket 59 (FIG. 5). This movement disengages the driving wheel 71 from the fan belt 31 to stop operation of the pump unit 38 and thus deactuate the washer unit 21, and also forces the unit wire 72 to the right (FIGS. 3 and 5) to return the push rod 111, the carrier 113 and the extension 118 to their normal positions.

The contact carrier block 129 is then free to move to the right (FIG. 3) under force of the spring 146 except for the delaying action of the vacuum cup 170 in the time delay 97. As the force of the spring 146 is not sufficient to overcome the initial opposite force of the vacuum seal set up by the vacuum cup 170, the seal will not be broken until sufficient fluid has bled through the filters 180 and into the vacuum space 189. Thus, when the difference in fluid pressure within and without the cup 170, multiplied by the effective area of the cup, equals the return force of the spring 146 minus the static friction of the movable components affected, the seal will be broken and the block 129 free to move. In comparison then to the fast disengagement of the pump unit 38, the movement of the reversing switch 96 from its "on" position to the "off" or "park" position, indicated by the dotted line contact rows 141—143 in FIG. 11, is delayed and thus subsequent in time to the comparable change of the pump unit 38 from "on" to "off."

When the reversing switch 96 has reached the "park" position, as was the case with the change of the switch 57 from the "on" position back to "park," the direction of flow of current through the field 214 (FIG. 11) is reversed. The motor output rotation is also reversed whereupon the parking switch 221 is then mechanically actuated to open the circuit 55 and stop the motor operation.

It may be noted here, that should the hand operated switch 57 be in the "on" position and the push rod 111 be depressed, the control circuit 55 would be unaffected as a practical matter, with the wipers 54 continuing their normal oscillation.

Although only one embodiment of the invention is disclosed herein, it is to be remembered that various modifications and alternate constructions may be made within the full intended scope of the invention as defined by the appended claims.

I claim:

1. In a vehicle having a windshield with wipers therefor and an engine with an external element movable during operation of the engine, a system for clearing the windshield comprising, fluid discharge means operable upon contact with said element to discharge a fluid against said windshield, motor means operable to move said wipers either in an operating direction or in a parking direction, circuit means including a manually operated switch for selectively controlling the operation of said motor means, and control means for said system including a manually operable device operatively connected to said fluid discharge means for movement thereof into and out of contacting engagement with said engine element, switch means interposed in said circuit means and operable by movement of said device, said switch means including relatively movable contact members certain of which are alternately movable in opposite directions to selectively control the operation of said motor means, and time delay means actuated by movement of said certain contact members in one direction to delay their alternate movement in another direction.

2. In a vehicle having a windshield with wipers therefor and an engine with an external element movable during operation of the engine, a system for clearing the windshield comprising, means for discharging a fluid against the windshield including a movably mounted pump unit operable upon contact with said element, electric wiper motor means operable to move said wipers in either an operating direction or in a parking direction, circuit means including a manually operated switch for selectively controlling the operation of said motor means, and control means for said system including a reciprocally movable member, an actuating device movable by said member and connected to said pump unit for movement thereof into and out of contacting engagement with said engine external element, electric switch means including a plurality of stationary terminals interposed in said circuit means and a plurality of contacts mechanically connected as a unit to said actuating device and reciprocally movable thereby relative to said terminals and adapted for selective electrical interconnection therewith for selectively controlling the operation of said wiper motor means, and time delay means actuated by said movable contacts and operable to delay movement of said movable contacts for operating said wiper motor to move said wipers in said operating direction relative to an opposite movement thereby for operating said wiper motor to move said wipers in said parking direction.

3. In a vehicle having a windshield with wipers therefor and an engine with an external element movable during operation of the engine, a system for clearing the windshield comprising, fluid discharge means operable upon contact with said element to discharge a fluid against said windshield, means including an electric wiper motor the rotational output of which causes said wipers to move either in an operating direction or in a parking direction, circuit means including an electric switch for selectively controlling the rotational output of said wiper motor, and control means for said system including an actuating device manually movable in a first direction to force said fluid discharge means into contacting engagement with said engine element, and movable in a second direction to disengage said fluid discharge means from said engine element, switch means interposed in said circuit and movable by said actuating device in a first direction to control the said rotational output of said wiper motor to move said wipers in an operating direction, and movable in a second direction to reverse the rotational output of said wiper motor, and time delay means connected to and movable by said switch means in a first direction at a first rate of movement, and movable in a second direction at a second rate of movement slower than the first rate of movement of said time delay means, whereby to retard the second directional movement of said switch means relative to the second directional movement of said actuating device.

4. A switch actuating assembly for a vehicular windshield clearing system having a washer unit with a pump unit operable to discharge a fluid against the vehicle windshield, a wiper unit having wiper blades and a reversible electric wiper motor operatively connected to said blades for movement thereof in either an operating direction or a parking direction, and a control circuit including an electric switch for selectively controlling the operation of said wiper motor and including further a parking switch for automatically opening said circuit upon movement of said wiper blades in said parking direction; said switch actuating assembly comprising, a mounting bracket for attachment to the vehicle, a plunger rod mounted on said bracket for reciprocal movement, a carrier member secured to said plunger rod and movable therewith, a flexible wire unit connected to said carrier member and adapted for connection to the pump unit whereby movement of the said plunger rod operates the wire unit to start the operation of said pump unit, electric switch means mounted on said bracket and actuated by movement of said plunger rod, said switch means including relatively movable contact members certain of which are alternately movable in different directions between two positions for selectively controlling the operation of said wiper motor, and time delay means mounted on said bracket and operable by movement of said certain contact members to delay the movement of said certain contact members in one direction relative to the movement thereof in the other direction.

5. A switch actuating assembly for a vehicular windshield clearing system having a washer unit with a movably mounted pump unit operable in a position to discharge fluid against the vehicle windshield, a wiper unit having wiper blades and a reversible electric wiper motor operatively connected to said blades for movement thereof in either an operating direction or a parking direction, and a control circuit including an electric switch for selectively controlling the operation of said wiper motor and including further a parking switch for automatically opening said circuit upon movement of said wiper blades in said parking direction; said switch actuating assembly comprising, mounting means for attachment to the vehicle, a horizontally disposed rod member connected to said mounting means for reciprocal movement and wherein a portion of said rod is adapted to protrude into the driver's compartment of said vehicle, a carrier element secured to said rod member and having an extended portion axially aligned therewith and another portion depending therefrom, a flexible cable unit connected to said depending portion and adapted for connection to the pump unit whereby movement of said rod member is transmitted to the pump unit for controlling the operational position of said pump unit, two-position electric switch means interposed in said control circuit and having a contact carrier which is connected to said extended portion for movement therewith, the carrier of said switch means being reciprocally movable in different directions between two positions for selectively controlling the operation of said wiper motor, and time delay means operatively connected to said contact carrier to delay the movement of said contact carrier in one direction relative to movement thereof in the other direction.

6. A switch actuating assembly for a vehicular windshield clearing system having a washer unit with a pump unit operable in a position to discharge a fluid against the windshield, a wiper unit having wiper blades and an electric wiper motor the rotational output of which is reversible, said wiper motor operatively connected to said blades for movement thereof in either an operating direction or a parking direction, and a control circuit including an electric switch for selectively controlling the operation of said motor and including further a parking switch for automatically opening said circuit upon movement of said wiper blades in said parking direction; said switch actuating assembly comprising, mounting means for attachment to the vehicle, manually operable actuating means secured to said mounting means and adapted to be operatively connected to the pump unit for positional control thereof, switch means in said circuit operable in response to operation of said actuating means and adapted to alternate between a first position in series with said electric switch and a second position wherein said switch means is in parallel with said electric switch, and time delay means operatively connected to said switch means and adapted to increase the time required for changing from said second position to said first position relative the time required for the change from said first position to said second position.

7. A switch actuating assembly for a vehicular windshield clearing system having a washer unit with a pump unit operable in a position to discharge a fluid against the windshield, a wiper unit having wiper blades and a reversible electric wiper motor operatively connected to said blades for movement thereof in either an operating direction or a parking direction, and a control circuit including an electric switch for selectively controlling the operation of said motor and including further a parking switch for automatically opening said circuit upon movement of said wiper blades in said parking direction; said switch actuating assembly comprising, mounting means for attachment to the vehicle, manually operable actuating means secured to said mounting means and adapted to be operatively connected to the pump unit for positional control thereof, said actuating means including an extension member movable with operation of said actuating means, switch means including a housing having a carrier member engageable by said extension member and reciprocally movable in said housing and to which a plurality of electrical contacts are secured, means mounted within said housing for biasing said carrier member toward a first position wherein said carrier member is in contact with said extension member, a cap device mounted on top of said housing and including a plurality of electrical terminals interposed in said control circuit, said carrier member being movable from said biased position wherein certain of said contacts contact certain of said terminals to another position by said extension member wherein certain of said contacts contact certain other of said terminals, said two positions selectively controlling the operation of said wiper motor relative said wiper blades, and time delay means operable by said carrier member to retard the biasing action of said biasing means.

8. A switch actuating assembly for a vehicular windshield clearing system having a washer unit, a wiper unit including a reversible electric wiper motor, and a control circuit for said wiper unit including a hand operated switch for selective control of said motor; said switch actuating assembly comprising, mounting means for attachment to the vehicle, actuating means on said mounting means for controlling the starting and stopping of said washer unit operation, reversing switch means on said mounting means and including an electric contact carrier movable by operation of said actuating means from a first position to a second position wherein said switch means is operable to start the operation of said wiper motor concurrently with the start of operation of said washer unit, said switch means including further biasing means for returning said contact carrier to said first position wherein said switch means is operable to cause said control circuit to stop the operation of said wiper motor, and time delay means including a housing having a sealed chamber formed therein and containing fluid, a flexible member in said chamber having a concave circular face portion facing one end of said housing, an element extended through said housing and connecting said portion to said contact carrier, said one end of said housing having a circular plate element secured thereto and spaced from said end, a fluid passage formed substantially centrally through said plate element, and a mass of porous material inserted between said plate element and said housing end and wherein the outer edge of said mass contacts said fluid and the center portion of said mass registers with said passage.

9. A time delay device for a vehicular windshield clearing system having a washer unit, a wiper unit with an independent control therefor, and a manually operable actuating assembly for said units including an actuating device for starting and stopping operation of said washer unit and a control means operable independently of said independent control and operatively connected with said actuating device for starting the operation of said wiper unit concurrently with said washer unit operation, the control means including biasing means adapting said control means to stop the operation of said wiper unit; said time delay device adapted to retard the action of said biasing means whereby to delay the stopping of said wiper unit operation relative the stopping of said washer unit operation and comprising, a circular housing having a sealed chamber formed therein and containing fluid, a circular flexible member mounted in said chamber and having a concave face which faces one end of said chamber, said one end having a substantially flat surface facing said concave face, a plate unit including a circular plate element having a diameter less than that of said chamber and more than that of said flexible member when said member is in a flattened position, said plate element spaced from said one end, and a threaded stem portion secured to said plate element and protruded from the one end of said housing, a plurality of porous members mounted about said stem portion and in the space between said plate element and said flat surface, a fluid passage formed centrally through said plate element and said stem portion within said chamber whereby the centers of said porous members are open to said fluid, an adjusting nut threadably inserted on said stem portion for varying the spacing of said plate element from said one end, and a connector rod secured to said flexible member and slidably inserted through the other end of said housing and connected to said control means, whereby upon the operation of said control means to start said wiper unit said connector rod forces said flexible member into a position against said plate element wherein said flexible member is substantially expanded to form a vacuum seal against said plate element.

10. A time delay device comprising, a housing including a sealed fluid chamber formed therein and containing a fluid, fluid flow restricting means mounted at one end of said chamber, fluid passage means formed in said restricting means and having a central opening and a peripheral opening both of which are open to said chamber, a vacuum cup mounted for reciprocal movement within said chamber in spaced relation with said restricting means and with the concave side thereof facing said central opening, said vacuum cup adapted for movement toward and into contacting engagement with said restricting means whereby the periphery of said vacuum cup is located between said central opening and said peripheral opening, and biasing means tending to move said vacuum cup away from said contacting relation, whereby a vacuum open to said central opening is formed in the concavity between said vacuum cup and said restricting means.

11. A time delay device comprising, a housing including a sealed fluid chamber formed therein and containing a fluid, said housing having walls and two opposite ends, each end having formed therethrough an opening, flexible means mounted within said chamber and including a flexible member having a concave circular face portion facing one end of said chamber, shaft means attached to said flexible member and extended through the opening in the other end of said housing and adapted for reciprocal movement therethrough, means external said housing connected to said shaft means and biasing said shaft means outwardly of said chamber, plate means mounted at the one end of said chamber and including a circular plate spaced between said flexible member and said one end, the periphery of said plate spaced from the walls of said housing, said plate means including further means inserted through the opening in said one end for adjusting the spacing of said plate from said one end, a fluid passage formed through said plate and said adjusting means and leading from the side of said plate adjacent said flexible member to the space between said plate and said one end, and porous means inserted in the said space between said plate and said one end and completely covering the fluid passage opening in said chamber space, said flexible member adapted upon movement of said shaft means inwardly of said chamber to contact said plate and upon a ceasing of said movement to form a vacuum therebetween due to the bias of said biasing means on said shaft means, whereby to draw said fluid from the chamber through said porous means and said fluid passage and into the said vacuum formed between said flexible member and said plate.

References Cited in the file of this patent

UNITED STATES PATENTS

| | | |
|---|---|---|
| 1,685,037 | Van Derbeck | Sept. 18, 1928 |
| 2,215,953 | Birr | Sept. 24, 1940 |
| 2,595,098 | Poglay | Apr. 29, 1952 |
| 2,651,802 | Kearful | Sept. 15, 1953 |
| 2,705,623 | Glassenhart et al. | Apr. 5, 1955 |
| 2,810,797 | Gulnick | Oct. 22, 1957 |
| 2,834,978 | Harrison | May 20, 1958 |
| 2,878,505 | Ziegler | Mar. 24, 1959 |

FOREIGN PATENTS

| | | |
|---|---|---|
| 457,730 | Great Britain | Dec. 4, 1936 |